United States Patent
Joannon

[11] 3,805,822
[45] Apr. 23, 1974

[54] APPARATUS FOR CONTROLLING A TAP AUTOMATICALLY

[75] Inventor: Jean J. Joannon, Cap D'Antibes, France

[73] Assignee: Societe Civile Bermec, Antibes, France

[22] Filed: Feb. 25, 1972

[21] Appl. No.: 229,493

[30] Foreign Application Priority Data
Mar. 19, 1971 France.............................. 71.11006
Mar. 19, 1971 France.............................. 71.11008

[52] U.S. Cl................. 137/390, 137/406, 137/414, 25/46, 251/331
[51] Int. Cl............................................ F16k 21/18
[58] Field of Search .......... 137/386, 389, 390, 403, 137/414, 406, 561 R, 637; 251/45, 46, 293, 331

[56] References Cited
UNITED STATES PATENTS
2,871,873  2/1959  McQueen .......................... 137/390
3,386,462  6/1968  Walters ........................... 137/406 X
3,433,249  3/1969  Nelson .............................. 137/390

Primary Examiner—Henry T. Klinksiek
Assistant Examiner—David R. Matthews

[57] ABSTRACT

A control apparatus for a tap for filling a tank connected to a conduit for the supply of liquid under pressure and to a discharge conduit. It comprises a manometric device connected to the said tank, an escape channel connected between the said manometric device and the said tap, a first valve controlled by the said manometric device, a second needle valve controlling the opening and closing of the said tap, first diaphragm fixed to the said needle placed in a chamber communicating with the said conduit for the entry of liquid and the said escape channel in such a manner that the first valve controls the pressure in the said chamber and consequently the second valve and the said tap. Said control apparatus may be used in the equipment of a bathroom.

2 Claims, 18 Drawing Figures

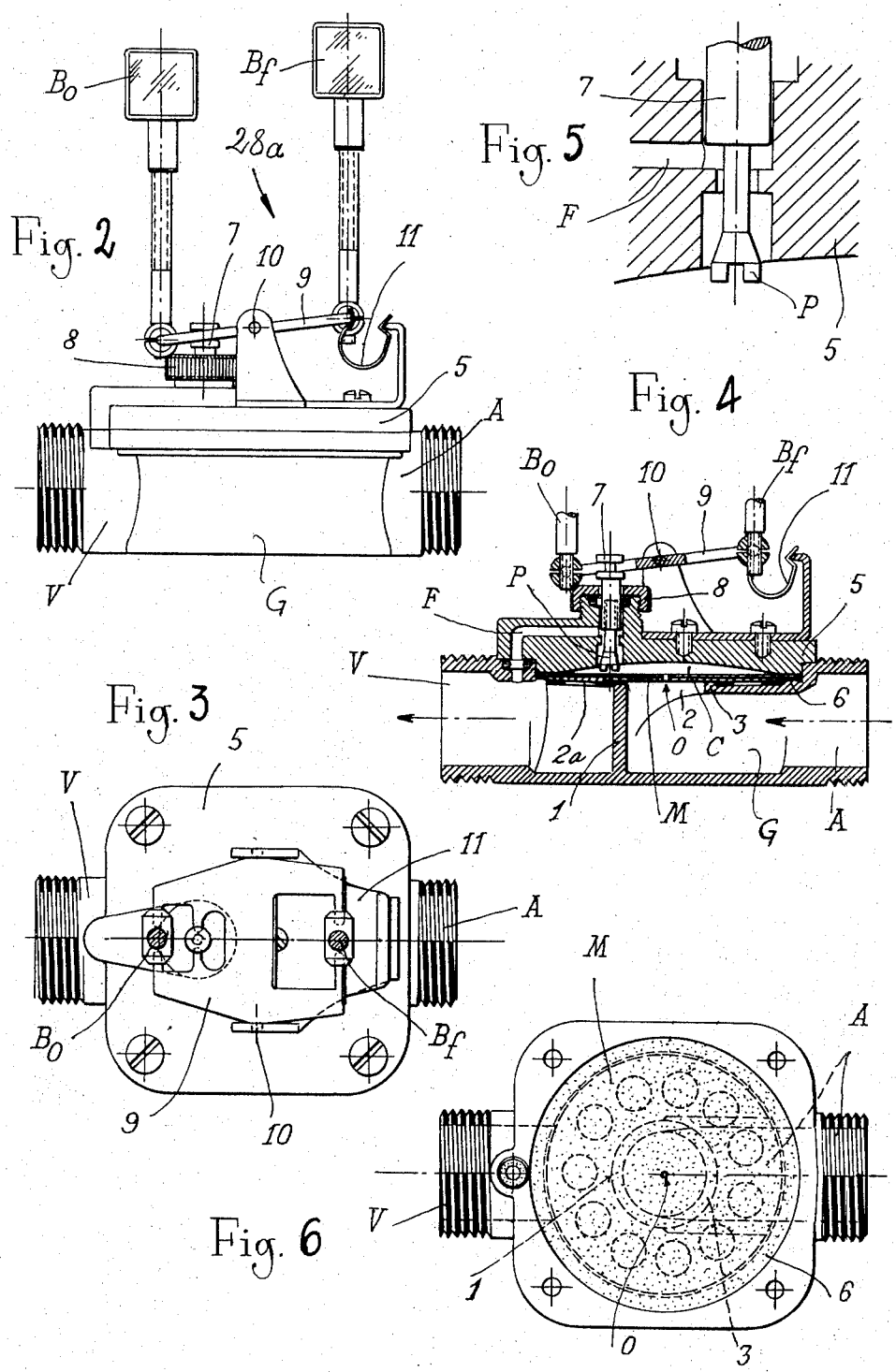

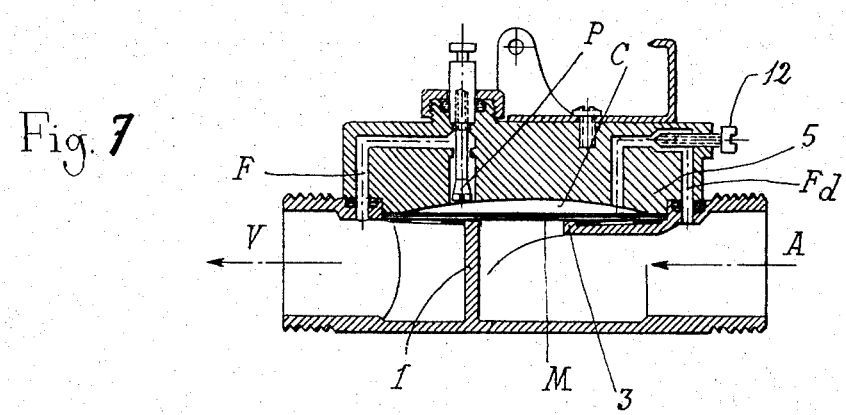
Fig. 7
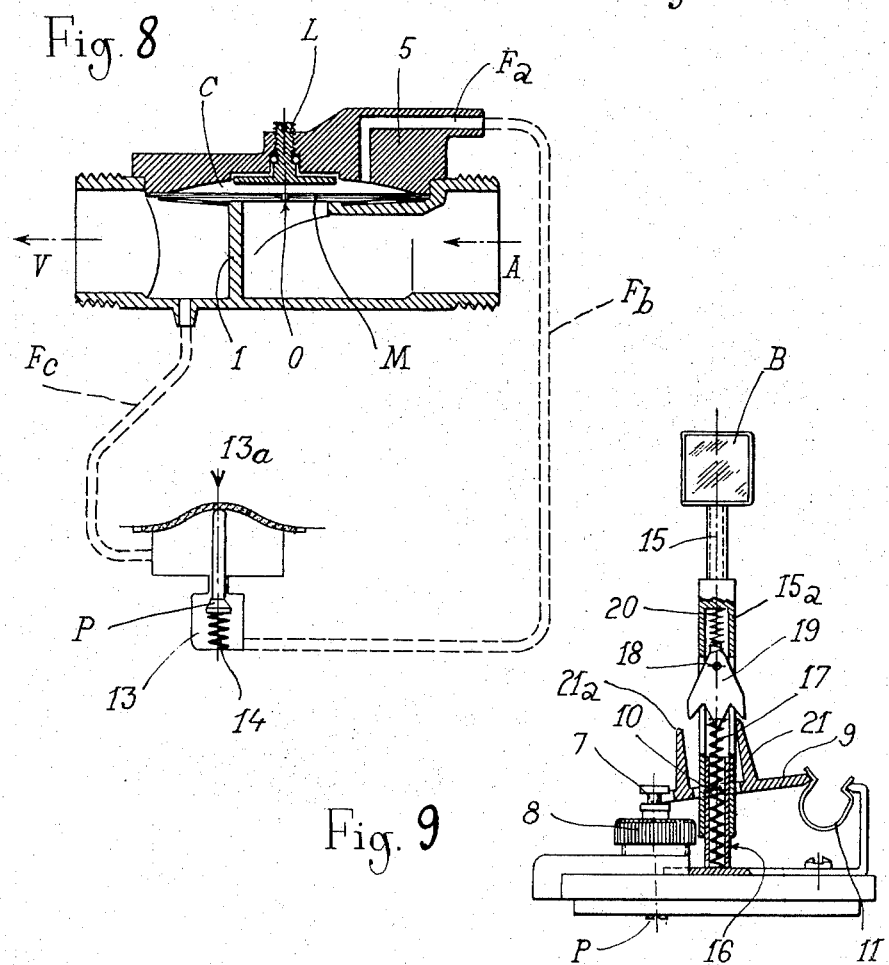
Fig. 8
Fig. 9

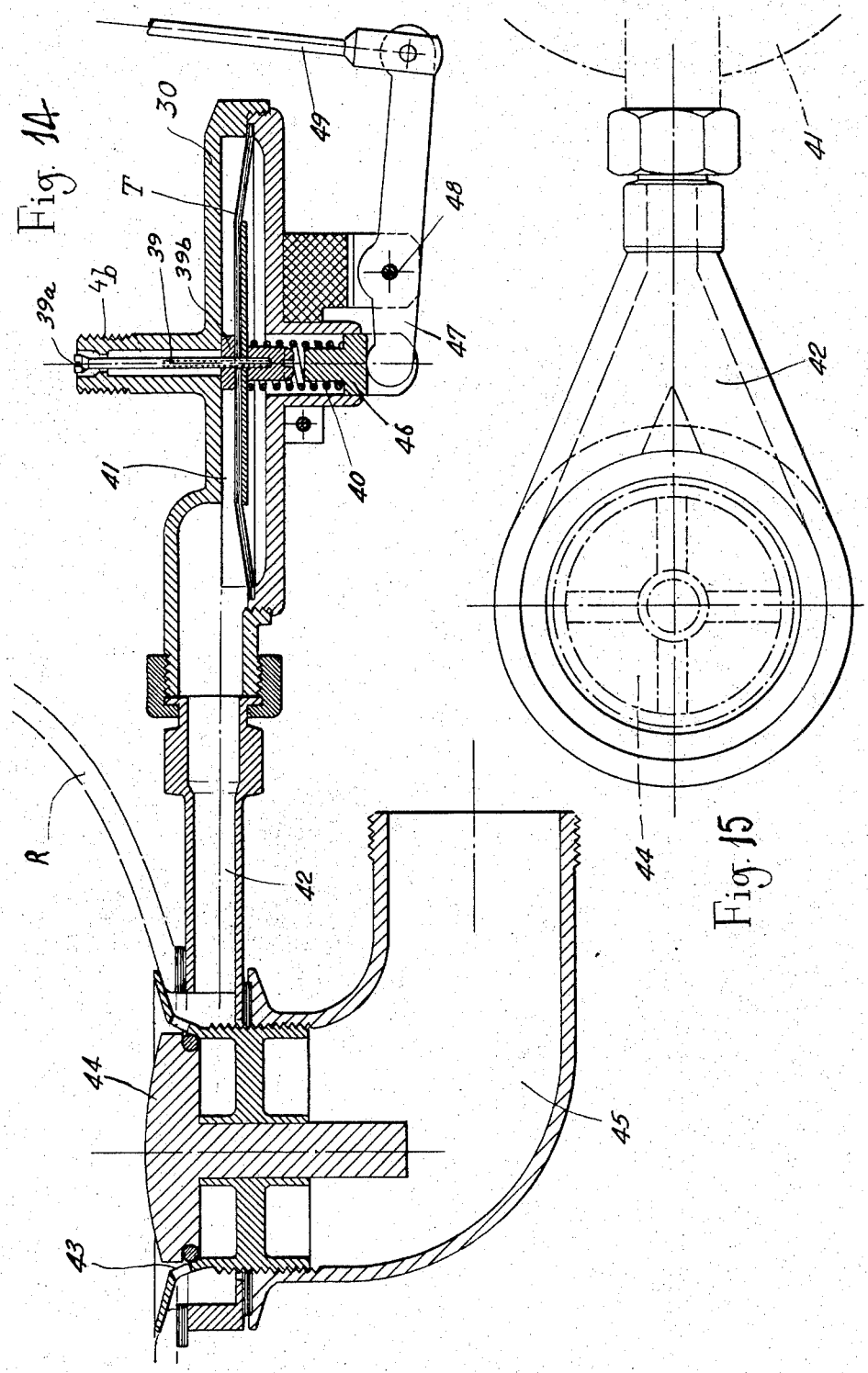

APPARATUS FOR CONTROLLING A TAP AUTOMATICALLY

The invention relates to apparatus for controlling a tap automatically or manually, and also an improved tap used in this automatic or manual control. The apparatus is particularly adapted to the automatic control of the closing of the said tap when the liquid which it is delivering to a tank reaches a predetermined level.

Numerous devices for controlling the delivery from a tap have been proposed, making use in general of complex means including for instance several valves, one of which at least is controlled by a device with a double diaphragm.

The apparatus in accordance with the invention is simpler and has increased reliability.

According to the invention there is provided control apparatus for a tap for filling a tank connected to a conduit for the supply of liquid under pressure and to a discharge conduit including a manometric device connected to the said tank, an escape channel connected between the said manometric device and the said tap, a first valve controlled by the said manometric device, a second needle valve controlling the opening and closing of the said tap, a diaphragm fixed to the said needle placed in a chamber of communication with the said conduit for the entry of liquid and the said escape channel in such a manner that the first valve controls the pressure in the said chamber and consequently the second valve and the said tap.

The invention will be further described by way of example only and not by way of limitation with reference to the description which follows and the attached drawings in which:

FIG. 2 is a side view of part of the apparatus in accordance with FIG. 1;

FIG. 3 is a top view of the apparatus of FIG. 2, part having been removed;

FIG. 4 is an axial section of the apparatus of FIG. 3;

FIG. 5 shows a detail of the apparatus of FIG. 4, on a larger scale;

FIG. 6 shows a plan view of the apparatus of FIG. 3 after removal of the mechanism situated above the control diaphragm.

FIGS. 7 and 8 show in axial section apparatus similar to that of FIG. 4, but constituting respectively second and third embodiments of the invention;

FIG. 9 shows a sectional view of a variation of the control mechanism of the apparatus of FIG. 4;

FIGS. 14 and 15 show respectively views in section and in plan of part of the apparatus of FIG. 1, and FIGS. 16 and 17 show in detail and in section a regulating device for the control of the tap of the bath equipment of FIG. 1.

Figure 1:
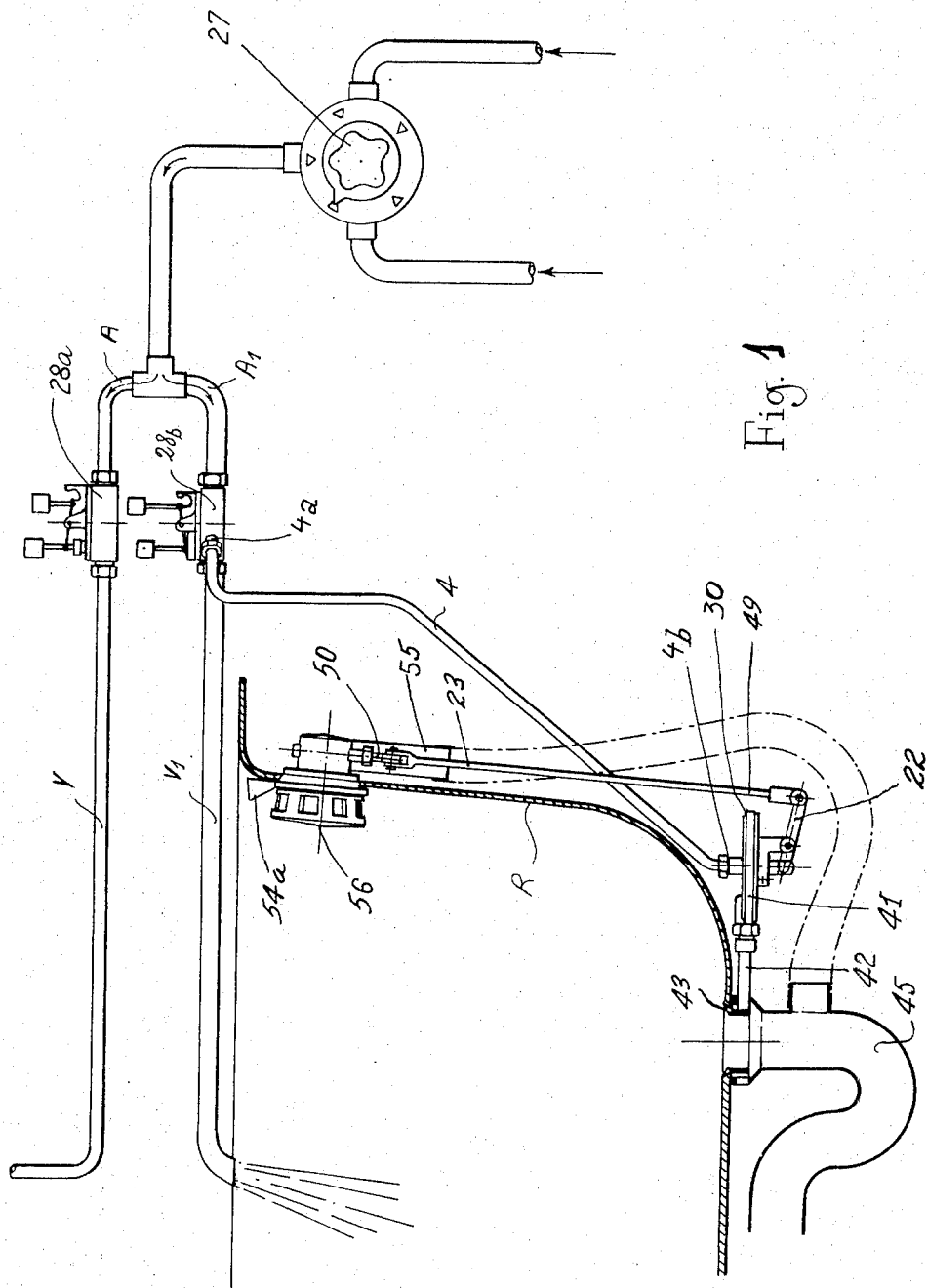
FIG. 1 shows diagramatically an apparatus in accordance with the invention applied to equipment for a bath and for a shower for the bath.
Figure 10:
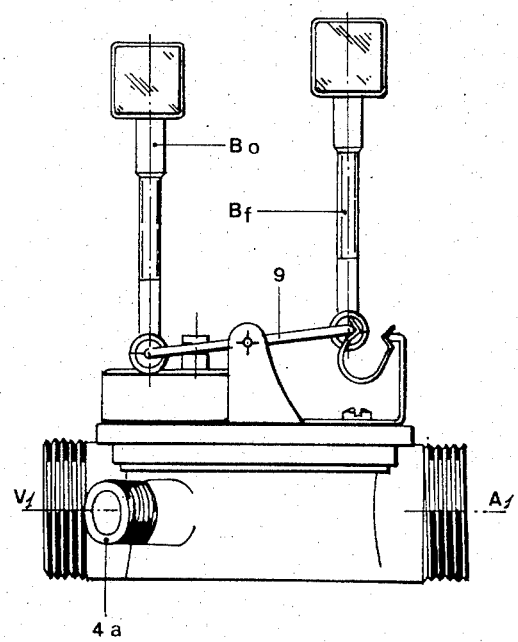
FIGS. 10 and 11 show views in elevation and in plan of a fourth embodiment of the invention, utilisable in the bath equipment of FIG. 1.
Figure 11:
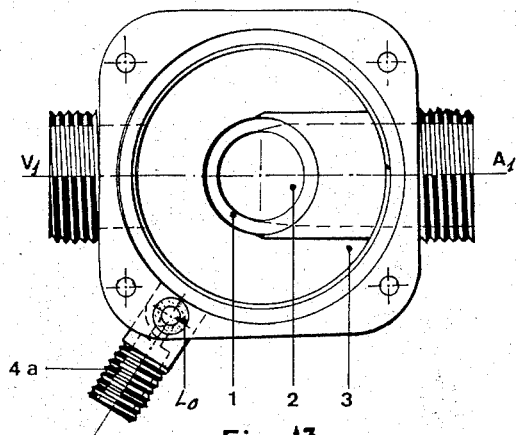
Figure 13:
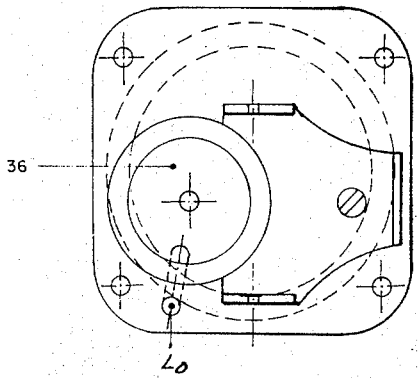
FIG. 13 is a view similar to that of FIG. 11, but with the upper mechanism removed.

In FIG. 1 the bath R is supplied with water through a mixer 27 for hot and cold water of conventional type and a tap 28b which is opened manually but the closing of which is controlled automatically by a manometric device 30 in communication with the bottom of the bath by a water line 42 and holes 43 made in the periphery of the valve for the water drain of the bath and connected to the said tap by a water pipe 4. The manometric device 30 is itself regulable manually by means of a control knob 56 connected to the said device by a system of rods 22, 23. The shower is supplied with water from the same mixer 27 through a tap 28a analogous in principle to the tap 28b but simpler, since it is manually controlled.

The water mixed by the mixer 27 reaches the tap 28a through the pipe A and issues through the pipe V whereas it reaches the tap 28b through the pipe $A_1$ and issues through the pipe $V_1$.

The manual control tap 28a will be first described, and following that the tap 28b, which is similar in principle, combined with the manometric device 30 which controls the closing of tap 28b when the water level in the bath has reached a prearranged, regulable level.

Use is made in the construction of said valve tap 28a of a device of conventional type in which the valve is constituted of a flexible diaphragm interposed between the seat of a piping for the supply of liquid, the section of which has a surface area smaller than that of the diaphragm, and a counter-pressure chamber of the same surface area as that of the diaphragm supplied with water from upstream of the seat through a small, calibrated hole formed in the said diaphragm. The filling with water of the counter-pressure chamber through the regulable calibrated hole determines the application of the diaphragm onto its seat.

The above device is interposed between upstream and downstream of one and the same conduit, the space between the external periphery of the seat and the annular portion of the diaphragm being in permanent communication with the upstream of the said conduit. An escape channel of the counter-pressure chamber conveys its liquid downstream of the conduit, and there is a closure means, preferably a needle valve, which is held normally in closed position to bring about or maintain the closing of the diaphragm valve.

The valve is accordingly under the control of the on/-off action of the said needle, and this action is easily obtained in the conventional manner by a rocker system with one or two pushers.

In FIGS. 2 and 6, which illustrate the tap 28a, the conduit G for the liquid is divided by a transverse hemicylindrical wall 1 into two portions upstream A and downstream V, the upstream portion A having a lateral opening 2 defined by a valve seat 3 and the downstream portion V having a corresponding lateral opening 2a in such a manner that the liquid supplied through 2 can bypass the wall 1 and enter the downstream portion of the conduit through the opening 2a. A plate 5 carrying a control mechanism covers the above mentioned openings 2 and 2a applying to a peripheral closure seat 6 a flexible diaphragm M which is intended to close the conduit by being pressed onto the seat 3 in the manner of a valve. The said diaphragm defines between itself and the plate 5 a chamber C which remains in communication with the upstream portion A through a small calibrated hole 0 of the diaphragm and which consequently tends to become permanently filled with water under pressure. An escape channel F controlled by a needle valve P is arranged between the said chamber C and the downstream portion of the conduit in such a manner that if the needle P is in the opening position as shown in FIGS. 4 and 5, no counter-pressure can be established in the chamber C, the pressure of water upstream raises the diaphragm and liquid flow is established over the wall 1, whereas if the needle P is in closing position, the pressure gradually rises in the said chamber C and as it acts on the rear of the diaphragm M over a surface area greater than that of the seat 3, it eventually predominates and applies the diaphragm onto the seat 3 preventing liquid from passing.

In the construction shown, the needle P is mounted on a stem 7 which slides in a sealing joint forming a seat and clamped by a milled nut 8 which is articulated to one of the arms of a rocker 9 of conventional type carried by a pivot point 10 and provided with omega spring 11. By pressing on the push button $B_o$ one opens the needle valve and enables the water under pressure upstream to raise the diaphragm and to pass downstream; by pressing on the other push bottom $B_f$ one closes the needle valve, the pressure mounts in the chamber C and brings the diaphragm M onto its seat.

FIG. 6 shows that the upstream portion of the conduit forms with the vertical hemi-cylindrical wall 1 a closed recess which opens out at the top through the opening 2 of the seat 3, whereas the downstream portion forms an annular chamber enclosing the said recess and opening out itself through the lateral tubing V which can be arranged either as shown in alignment with the supply tubing A or on the side at a right angle to it.

FIG. 7 shows the main pieces of a tap similar to the one described above but in which in addition to the escape channel F described above means are provided for making it possible to vary at will the passage section of the supply channel $F_d$ of the counter-pressure chamber C, such as a needle valve 12. The said counter-pressure chamber C is accordingly supplied with water from upstream of the seat 3 and it fills as a function of the opening of the needle 12 in such a manner as to obtain a very progressive closing of the tap, avoiding any risk of hydraulic recoil.

FIG. 8 shows diagrammatically how the tap may be arranged so that it remains open only during periods when its control is being operated, and then closes automatically when the control is no longer operated.

In FIG. 8 control is effected by foot, the needle P being carried in a valve box 13 connected by a channel, which may or may not be flexible, $F_b$ to the channel $F_a$ arranged in the plate 5; when the needle is lowered by pressure of the foot on the top of its stem at 13a, the valve is opened by compressing the spring 14 and the liquid flows through the channel $F_c$ into the downstream portion V of the conduit. Between the plate 5 and the dome of the counter-pressure chamber C there is a screw L and its support, by means of which screw it is possible to regulate the height of the counter-pressure chamber C between the plate 5 and the diaphragm M. The shifting of the diaphragm M between opening and closing is accordingly restricted as desired by the screw L and its support, which makes it possible to regulate the rate of flow.

In FIG. 9, the needle P can be seen, as in FIGS. 3 and 6, arranged on an escape channel formed entirely in the plate 5 and is controlled by a single two-way push button B and an articulated rocker the operation of which is shown in FIG. 1. The stem 15 of the push button B is extended downwardly by a pipe 15a which can slide on a fixed guide pipe 16 containing retracting spring 17; the tubular stem 15a carries the oscillation axis 18 of a pawl 19 which is held in the extension of 15a by the traction spring 20 and which co-operates with the end of a lug 21 of the rocker after having opened the tap by lowering the push button B, the pawl 19 and the lug 21 driving the rocker into closure position and compressing the spring 17 in the position shown. If one retracting the control knob, the release spring 17 thrusts the mobile unit back, leaving the tap closed. On the push button being operated again, the pawl 19 acts on the lug 21a and drives the rocker into the opening position. The spring 17 recalls the mobile unit and the tap remains open.

The tap 28b (FIG. 1) with hydraulic control will now be described.

Tap 28b, as can be seen in FIGS. 10 to 13, has the same components as the tap 28a of FIGS. 1 to 6 but in addition a supplementary chamber 36 in which a diaphragm 37 is fixed which is integral with the needle 38a of a valve 37 the seat of which is formed in the cover 35. The said needle 38a, when it is on its seat prevents any communication between the chamber C and 36. The said tap may be operated manually by means of the push buttons $B_o$ and $B_f$ as described above, but in addition its closing can be controlled automatically by the level of the water in the bath R. For this purpose there is provided, as mentioned above, an escape channel 40 (FIGS. 12a and 12b) which starts from the chamber 36, issues from the tap through the tubing 4a (FIG. 10) and, through the tubing 4b (FIG. 1) rejoins the manometric device 30 (FIG. 1).

FIGS. 14 and 15 show the manometric capsule the tubing 4b of which is connected by the above mentioned external channel 4 to the tubing 4a of the tap; the passage in the tubing 4b is controlled by a valve 39 having a needle 39a mounted on a diaphragm of large surface T which is thrust upwards by a spring 40. In FIG. 14, the level of water in the bath is low and the needle 39a is thrust upwards and released from its seat. The chamber 41 arranged above the diaphragm T is in communication with the water contained in the bath through a connection 42 and holes 43 made in the valve 44 of the discharge pipe 45 of the bath.

Figure 12A:
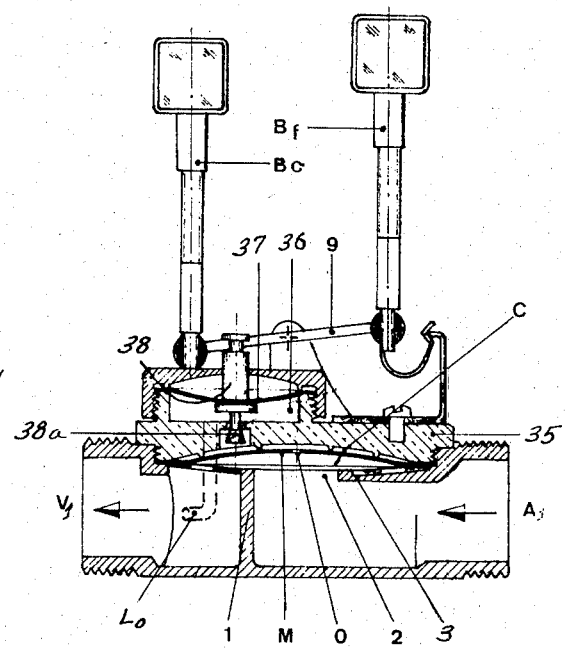
FIGS. 12a and 12b show two axial cross-sections of the apparatus of FIG. 10 corresponding respectively to its open position and its closed position.
Figure 12B:
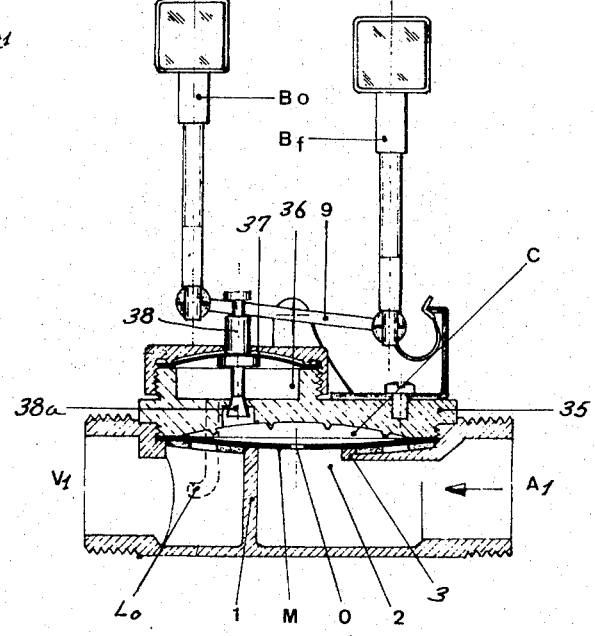

The diaphragm T of the capsule is subjected on one face to the pressure produced by the water column in the bath and on its other face to the thrust of the spring 40. The said diaphragm T accordingly responds at one time to the action of the spring if that is predominant, and at another time to the action of the water column if its thrust is greater; it is accordingly the variation in the level of the liquid in the bath which controls the opening or closing of the needle 39a. If the water column of the bath is such that it exerts sufficient pressure on the diaphragm T, the said diaphragm drops and brings the needle 39a onto its seat, which closes the escape channel $4_b - 4_a$, and the water under pressure from the channel $A_1$ is carried from the chamber C to the chamber 36, and consequently the pressure exerted on the diaphragm 37 in its turn brings the needle 38a onto its seat, which determines the closing of the tap (FIG. 12b).

When, following this operation, at the beginning of a fresh filling of the bath R, the tap 28b is opened by manual pressure on the push button $B_o$, the said tap 28b remains open as long as the level of water does not reach the level which releases the operations mentioned above. Indeed, the water under pressure from the supply channel A, which passes into the chambers C and 36 is discharged in proportion through the channel 40, the open needle 39a, the chamber 41, the connection 42 and the holes 43 of the bath. For this purpose the stop element 39b of the needle 39a (FIG. 14) is pierced with holes, which are not shown, and by which the interior of the tubing 4b is in communication with the chamber 41.

The spring 40 has been provided to make it possible to have a variation in the level of the water column in the bath at which the tap effects its closing operation. By regulating the tension of this spring 40 it will accordingly be possible to act in such a manner that the closing of the needle 39a and consequently the closing of the supply conduit $A_1$ takes place selectively at one or other of the pre-arranged scaled levels in the bath. For this purpose, the spring 40 is placed between the diaphragm T and a mobile member 46 operable by a lever 47 articulated at 48 to the mounting enclosing the diaphragm T and connected by means of a small rod 49 to the control device shown in FIGS. 16 and 17.

Figure 16:
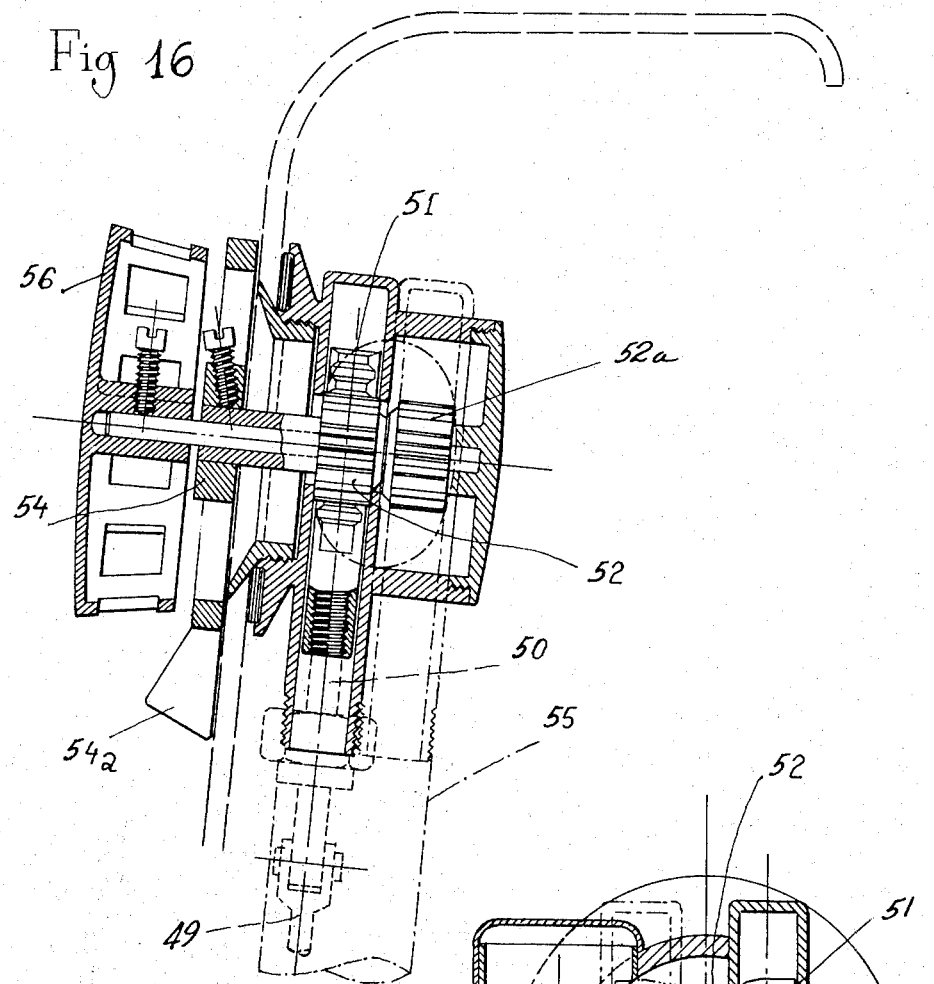
Figure 17:
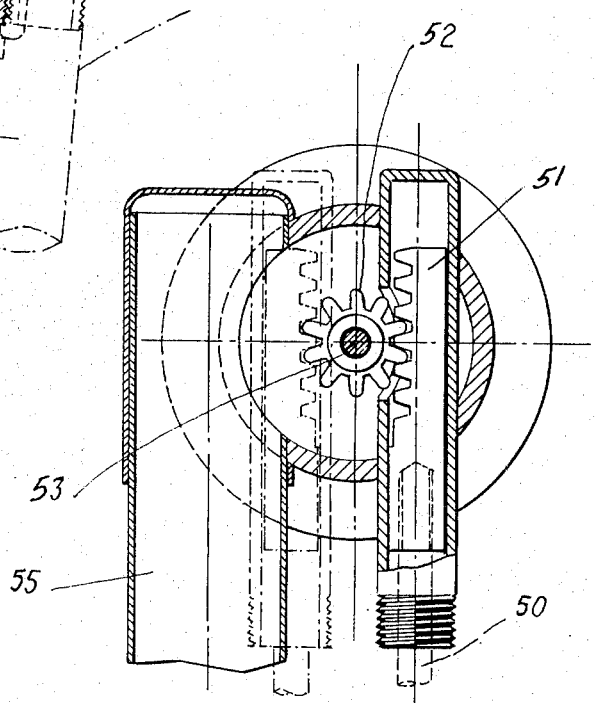

The small rod 49 (FIG. 16) is articulated by a fork member to the stem 50 of a rack 51 meshing (FIG. 17) on a tooth pinion 52 keyed on an axis 53 rotationally controlled by the operating lever 54. The said lever 54 forms at its end an indicator 54a which moves in front of a graduated sector indicating the various stop levels for the filling of the bath, corresponding to the various tensions of the spring 40. The said control device may advantageously be mounted on the customary vertical pipe 55 which is used as overlfow and which usually carries the knob 56 by which the opening of the discharge valve or the bath is controlled by means of a second rack, which is not shown, actuated by means of a second pinion 52a (FIG. 16).

When the graduated index has been set in such a manner that the filling of the bath stops automatically at any desired level indicated by the said index, if one then wishes to add a certain quantity of water to that contained in the bath, it is necessary to operate the lever 54, to open the needle 39a during the desired period.

It has been assumed that the opening of the needle valve 38 of the tap 28b was imperatively controlled by the customary device of an operating knob $B_o$ actuating a rocker 9. Since the closure of the needle is automatic there is no need for any other operating knob; however, a closure knob $B_f$ has been provided in the event of it being desired to substitute manual closing for automatic closing.

What I claim is:

1. In combination, control apparatus for a tap for filling a tank of liquid and a liquid tank fed by a tap which is connected to an incoming conduit for the supply of liquid under pressure, said tank being provided with a discharge conduit, said control apparatus including a sensitive hydraulic pressure device connected to said tank, a hydraulic junction conduit between said tank and said tap, a first hydraulic valve controlled by said sensitive device to cut off the connection between said tank and said junction conduit when the liquid pressure in said tank reaches a predetermined value, a communicating chamber between the incoming conduit and the junction conduit, a second hydraulic valve to control the opening and closing of said tap, a first diaphragm set in said chamber and fixed to said second valve whereby the closing of said junction conduit by means of said first valve when the tank pressure reaches said predetermined valve increases the liquid pressure in said conduit and in said chamber and moves said first diaphragm to close the second valve and consequently said tap.

2. Control apparatus as claimed in claim 1 wherein said tap comprises a conduit divided by a semicircular wall into downstream and upstream portions, a side opening in the downstream portion defining a valve seat, a side opening in the upstream portion, a flexible diaphragm having a small central hole the diaphragm moving against said semicircular wall and said valve seat when the first valve is closed and permitting liquid to bypass the conduit wall through said valve seat when said first valve is opened.

* * * * *